(12) United States Patent
Glasson et al.

(10) Patent No.: US 8,163,349 B2
(45) Date of Patent: Apr. 24, 2012

(54) METHODS FOR APPLYING A WASHCOAT AND HEAT TREATING A CERAMIC HONEYCOMB, AND TREATED ARTICLES

(75) Inventors: Thomas J. Glasson, Avon (FR); Martin J. Murtagh, Trumansburg, NY (US); Donna R. Seyler, Corning, NY (US)

(73) Assignee: Corning Incorporated, Corning, NY (US)

(*) Notice: Subject to any disclaimer, the term of this patent is extended or adjusted under 35 U.S.C. 154(b) by 639 days.

(21) Appl. No.: 11/998,288

(22) Filed: Nov. 29, 2007

(65) Prior Publication Data

US 2009/0142541 A1 Jun. 4, 2009

(51) Int. Cl.
*B05D 3/12* (2006.01)
(52) U.S. Cl. .................................. 427/376.2
(58) Field of Classification Search ............. 427/376.2
See application file for complete search history.

(56) References Cited

U.S. PATENT DOCUMENTS

| | | | |
|---|---|---|---|
| 4,532,228 A | 7/1985 | Golino et al. ............ 502/261 |
| 5,827,496 A * | 10/1998 | Lyon .................... 423/659 |
| 6,328,779 B1 | 12/2001 | He et al. ................. 55/523 |
| 7,122,612 B2 | 10/2006 | Tao et al. ............... 526/317.1 |
| 7,132,150 B2 | 11/2006 | Ogunwumi et al. ....... 428/117 |
| 7,166,555 B2 | 1/2007 | Shustack et al. ......... 502/159 |
| 2003/0180197 A1* | 9/2003 | Nunan ................... 422/177 |
| 2007/0098914 A1 | 5/2007 | Ingram-Ogunwumi et al. ................ 427/487 |

FOREIGN PATENT DOCUMENTS

EP 0798042 10/1997
WO WO 2007/050246 A2 5/2007

* cited by examiner

*Primary Examiner* — Michael Cleveland
*Assistant Examiner* — Tabatha Penny
(74) *Attorney, Agent, or Firm* — Susan S. Wilks (57) ABSTRACT

A method for treating a microcracked, ceramic substrate is provided that obviates the need for filling the microcracks of the substrate via a passivation step prior to sintering a layer of washcoat to the surfaces of the substrate that may either contain a catalyst, or provide a support layer for a catalyst subsequently applied. In the first step of the method, a slurry of particles of a washcoating composition is applied over the surface of the substrate such that particles of the composition are lodged into microcracks of the substrate. Next, the substrate is heat treated to between about 700° C. and 1300° C. The method is particularly applicable to ceramic honeycomb structures used as catalytic converters in automotive exhaust systems.

21 Claims, 8 Drawing Sheets

METHODS FOR APPLYING A WASHCOAT AND HEAT TREATING A CERAMIC HONEYCOMB, AND TREATED ARTICLES

FIELD

This invention relates to the application of catalyst or catalyst support washcoats to microcracked ceramic honeycomb substrates used for the catalytic breakdown of harmful exhaust emissions from internal combustion engines. More specifically, the invention relates to methods of making microcracked ceramic structures which have a catalyst supporting or catalyst containing washcoat which include heat treatment methods and which do not require the step of applying a crack-filling passivation layer over the substrate prior to applying the washcoat layer. Further, the invention provides ceramic honeycomb substrates that have been treated using the methods.

BACKGROUND

Ceramic honeycomb substrates are widely used as anti-pollutant devices in the exhaust systems of automotive vehicles, both as catalytic converter substrates in automobiles, and as particulate filters in diesel-powered vehicles. In these applications, ceramic honeycomb substrates are formed from a matrix of thin, porous ceramic walls which define a plurality of parallel, gas conducting channels. In honeycomb structures used as ceramic catalytic substrates in automobiles with gasoline engines, the gas conducting channels are open at both ends. A catalytic coating is applied to the outer surfaces of the walls. Exhaust gases, flowing through the channels, come into contact with catalytic coatings on the surfaces of the walls. These substrates are referred to as flow-through substrates. In diesel systems, exhaust gasses also come into contact with catalytic coatings on the surfaces of the walls. In diesel applications, ceramic honeycomb substrates also have end-plugs in alternate gas conducting channels to force exhaust gases to pass through the porous channel walls in order to capture and hence filter out soot and ash particulates prior to exhaust discharge. These substrates are referred to as ceramic wall-flow particulate filters and more specifically as diesel particulate filters.

Improving the performance of ceramic wall-flow substrates for treating engine exhaust gases through the use of ceramic honeycomb substrates having catalytic wall coatings to reduce polluting hydrocarbon and/or nitrogen oxide emissions is desirable. Improving methods of manufacturing these substrates is also desirable. And, providing improved parts using improved methods of manufacture are also desirable.

SUMMARY

Embodiments of the present invention include methods of coating a microcracked ceramic honeycomb with a catalytic washcoating composition and heat-treating the coated microcracked ceramic honeycomb by providing a ceramic honeycomb which has microcracks, applying a washcoat solution having particles to the ceramic honeycomb so that at least some of the particles enter at least some of the microcracks, and heat-treating the ceramic honeycomb with the applied washcoat to a temperature of between 700 and 1300° C. such that the microcracks are enlarged compared to a pre-heat treated state. In embodiments, the heat treating step may be a uniform heat treating step. In embodiments, the washcoat can have alumina particles of between 500 nm and 6 microns in diameter, or between 200 nm and 8 microns in diameter, or the washcoat can include alumina and/or catalytic component such as platinum, palladium and/or rhodium. In embodiments, the microcracked ceramic honeycomb may be made from any suitable microcracked material including cordierite or aluminum titanite.

In additional embodiments, as a result of these coating and heat-treating steps, structures are formed within the microcracks of the ceramic honeycomb structure which block the microcracks from closing in response to additional heat cycles. These structures can be described as dendrites or pillars, formed as a result of the heat-treatment, from particles of the washcoat solution or slurry that have been deposited into the microcracks during a washcoating step. At least 60% or even at least 90% of the microcracks of the ceramic honeycomb may become enlarged after the washcoating step and the heat-treating step compared to the washcoated, un-heat-treated microcracked ceramic honeycomb.

In embodiments, as a result of the washcoating step and the heat-treating step, the coefficient of thermal expansion (CTE) may be decreased by 20% or more compared to the untreated ceramic honeycomb. In additional embodiments, the modulus of elasticity ($E_{mod}$) of the substrate may be reduced as a result of the washcoating step and the heat-treating step by at 10% or more compared to an untreated ceramic honeycomb.

Additional embodiments of the present invention include ceramic honeycomb substrates which have microcracks, and which have dendrite or pillar structures within the microcracks as a result of the washcoating and heat-treatments of the present invention.

DETAILED DESCRIPTION

In embodiments, the present invention provides methods of making microcracked ceramic structures which have a catalyst supporting or catalyst containing washcoat which include heat treatment methods and which do not require the step of applying a crack-filling passivation layer over the substrate prior to applying the washcoat layer. In additional embodiments, the invention provides ceramic honeycomb substrates that have been manufactured and treated using the methods.

Ceramic honeycomb substrates can be characterized by measuring several parameters. The coefficient of thermal expansion (the CTE) is a measure of a material's expansion when heated. It is a measurement of the fractional change in the dimensions of the substrate per degree of temperature change. In general, as a material heats, it expands, and as a material cools, it contracts. The lower the CTE, the less a material changes in response to temperature changes. A low CTE is desirable in ceramic honeycomb structures used to treat exhaust gasses in engines, because these structures are typically exposed to significant temperature fluctuations. The elastic modulus (or Young's modulus or $E_{mod}$) of a material describes the stiffness of the material. The lower the $E_{mod}$ of a material, the more flexible the material is. While ceramic honeycomb structures are generally stiff structures, even slight reductions in $E_{mod}$ may represent significantly longer life of the structures in use by allowing the structures to respond to environmental changes without breaking. The $E_{mod}$ of a material generally increases with temperature (as well as with washcoat loading). Modulus of Rupture strength (MOR), usually determined by a flexure or torsion test, is a measure of the stress of a material at failure. Thermal Shock Parameter is a measurement that takes into account MOR, $E_{mod}$ and CTE in the following equation TSP=MOR/[(CTE)($E_{mod}$)]. The TSP is a measurement of the ceramic structure's ability to survive thermal strain resulting from temperature gradients in the material.

For example, when a substrate that has been washcoated is initially subjected to hot exhaust gases just after the starting of the engine, a substantial thermal gradient is created between the center of the substrate where the flow of hot gases is greatest, and the outer periphery of the substrate. Tensile hoop stresses around the outer periphery of the substrate can generate cracks or separations between the honeycomb matrix and the outer skin and lead to part failure. Parts that have high TSP are better able to withstand these significant temperature gradients (high MOR, low CTE and low $E_{mod}$).

Ceramic honeycomb structures with microcracks have been developed because microcracks are thought to contribute to low CTE. These microcracked ceramic honeycomb structures are fired, ceramic structures. As a structure heats, the expansion of the material can be significantly absorbed by microcrack closure, which considerably modulates the dimensional increases that would otherwise occur within the material with heating. However, during washcoating to provide catalytic material to the surfaces of the honeycomb structure, alumina or other washcoat material may fill the microcracks, leading to increased CTE.

To counteract this filling phenomenon, passivation coatings have been developed. Passivation coatings are pre-coatings applied to the walls of the ceramic substrates prior to the washcoating that can block the washcoating materials from intruding into the microcrack structure of the ceramics (see U.S. Pat. No. 4,532,228 and Publication No. 2007/0098914). These passivation coatings typically contain an organic polymer which fills the microcracks. A catalytic washcoating is then provided on top of the passivation coating. Then, when the structure is heated after washcoating, the polymeric coating is removed, leaving behind a substrate with a catalytic washcoating. Typically, these heating steps provide temperatures of between 400 and 600° C. Heat treatments in this temperature range serve to remove the polymer layer as well as to sinter the washcoating and bind the washcoat to the porous walls of the ceramic substrate. The organic composition of the passivation layer disposed in the microcracks prevents the particulate constituents of the washcoating composition from lodging in the cracks when the washcoating slurry is applied over the substrate, and the heat curing step removes the organic layer from the cracks via evaporation and ablation.

However, this passivation step is expensive and time consuming. The passivation step must be applied, and typically the part must then be dried prior to the application of a catalytic washcoating. Therefore, alternatives to a passivation coating are desirable. Accordingly, the applicants have recognized that there is a need for a process that allows a catalytic washcoating to be applied to ceramic flow-through and wall-flow particulate filters without increases in the CTE and consequent reduction of the thermal shock properties. In addition there is a need for a process that does not require a passivation coating process or other additional materials and processing steps.

Ideally, such a process would decrease both the CTE and the elastic modulus ($E_{mod}$) without any significant reduction in the modulus of rupture strength (MOR). Such a combination of characteristics would actually improve the ability of the substrate to sustain thermal shock, since such ability is dependent upon the magnitude of the thermal shock parameter, or TSP, which is defined as the modulus of rupture strength (MOR) divided by the product of the CTE and the elastic modulus ($E_{mod}$). Finally, such a process should not increase the back pressure experienced by the exhaust gases passing through the web walls, and should result in a uniform distribution of catalytic particles throughout the exterior portion of the web walls.

The applicants have surprisingly discovered that a heat treating step may be used in a washcoating method for microcracked ceramic substrates that obviates the need for a passivation step. Even more surprisingly, the applicants have discovered that the heat treating step, when applied to a substrate whose microcracks have been partially filled with the particulate component of a washcoating, can actually improve the thermal shock properties of the resulting substrate instead of degrading them, contrary to the teachings of the prior art.

The applicants have discovered that such heat treating sets the washcoating particles onto the walls of the honeycomb substrate and also causes the microcracks in the substrate to permanently enlarge as a result of the resistance of the lodged particles of washcoating composition against the walls of the cracks as they attempt to close as a result of thermal expansion of the substrate. The consequent enlargement of the microcracks advantageously reduces both the coefficient of thermal expansion (CTE) and the modulus of elasticity ($E_{mod}$) of the resulting substrate without substantially reducing the modulus of rupture strength (MOR) of the resulting substrate such that the thermal shock parameter TSP=MOR/[CTE·$E_{mod}$] remains substantially the same or is higher.

In embodiments of the invention, a method is provided. The method includes a washcoating step where a slurry of particles of a washcoating composition is applied over the surface of a substrate having microcracks so that particles of the composition flow through the pores of the ceramic material and are lodged into the microcracks of the substrate. The ceramic substrate may be a densely microcracked ceramic material, such as aluminum titanate. However, applicants have found that the invention may be advantageously applied to less densely microcracked ceramic materials, such as cordierite.

The particles may be alumina. The particles may include a particulate catalyst (which may be platinum, palladium, rhodium, or other catalytic materials known in the art, or alloys thereof). The particulate component of the washcoating slurry may have an average particle diameter of between about 500 nm and 6 microns, and more preferably between about 200 nm and 8 microns. Particles having a diameter within the aforementioned ranges are large enough to form deposits between the walls of the cracks that are strong enough to resist the closing of the crack walls during the heat treatment step, yet are small enough to lodge between the walls of the microcracks. If a catalytic material is present, the resulting washcoating layer serves as a catalytic layer. The washcoat may be applied by vacuum. The application of a vacuum to the walls of the substrate, in combination with the network of interconnected pores in the substrate walls, has the effect of depositing the particulate component of the washcoating slurry into substantially all of the microcracks.

In an embodiment of the present invention, a heating step is provided. The substrate may be heat treated to between about 700° C. and 1300° C. However, when a catalyst-containing washcoating slurry is used, the maximum temperature used in the heat treating step is preferably no more than about 1000° C. to avoid degradation of the catalyst.

The applicants have discovered that such heat treating not only sets the washcoating particles in the walls of the substrate, but also causes the microcracks in the substrate to permanently enlarge as a result of the resistance of the lodged particles of washcoating composition against the walls of the cracks as the substrate thermally expands. The washcoating particles, deposited within microcracks of the substrate, may act as a fulcrum during the heat treating step. As the temperature increases during the heat treating step, the substrate expands. However, because of the presence of washcoat particles within the microcracks, the microcracks cannot merely close in response to the expansion of the substrate. The microcracks are blocked from closing by the presence of the washcoat particles within the microcracks. In addition, the washcoat particles may sinter and crystallize during the heat treatment. This sintering and crystallizing may cause the washcoat particles to form structures such as pillars and dendrites which may be strong structures that resist the closing of the microcracks. In addition, the heat treatment may cause the liquid vehicle of the washcoat to evaporate, leaving behind solid particulate features which may sinter and crystallize to form pillars and dendrites. As the microcracks close in response to increasing temperature, the walls of the microcracks close against the washcoating particles and structures which act as fulcrums, causing the microcracks to actually expand in response to increasing temperature. The consequent enlargement of the microcracks advantageously reduces both the coefficient of thermal expansion (CTE) and the modulus of elasticity ($E_{mod}$) of the resulting substrate compared to an un-heat-treated substrate, without substantially reducing the modulus of rupture strength (MOR) of the heat-treated substrate such that the thermal shock parameter TSP=MOR/[CTE·$E_{mod}$] remains substantially the same or is higher compared to the un-heat-treated substrate. Additional washcoating steps may be applied before or after the heat treating step, in embodiments of the invention, to provide catalytic materials to the substrate if a first washcoating step is free from desired catalytic materials.

In embodiments, this effect of washcoating particles lodging in the microcracks of the substrate to cause the microcracks in the substrate to permanently enlarge occurs because washcoating particles form structures within the microcracks. These structures may be described as "pillars" or "dendrites." Pillars are essentially blocks of washcoating particles which lodge inside the microcrack, holding the microcrack open during temperature fluctuations. Dendrites are networks of washcoating particles, which provide a scaffolding structure which holds the microcracks open during temperature fluctuations.

The heat treating step is preferably carried out at a temperature and a length of time sufficient to cause between about 60% and 90% of the microcracks in the substrate to become reinforced by the washcoating particles, which may have formed pillar or dentrite structures within the microcracks, causing the microcracks to enlarge as a result of the resistance that the washcoating particles apply to the walls of the cracks as they close due to thermal expansion. The specific combination of temperature and time selected to implement the heat treating step will vary depending upon the specific composition of the substrate and the density of microcracks. The specific combination of temperature and time may result in at least about a 10% decrease in both the CTE and the $E_{mod}$ of the material.

In an additional embodiment, the methods of the present invention do not include a passivation step. That is, with the addition of a heat treatment step, no passivation step is required to produce coated ceramic substrates with characteristics similar to the characteristics shown by passivated substrates. For example, MOR measurements of substrates that have been treated according to embodiments of the present inventions are similar to MOR measurements taken from substrate samples that have experienced a passivation step without the heat treatment step of the present invention (see Table 1). In addition, TSP measured from substrates having experienced a heat treatment step but no passivation step showed similar trends and similar values as substrates having experienced a passivation step but not the heat treatment step of the present invention (see Table 2).

Figure 1:
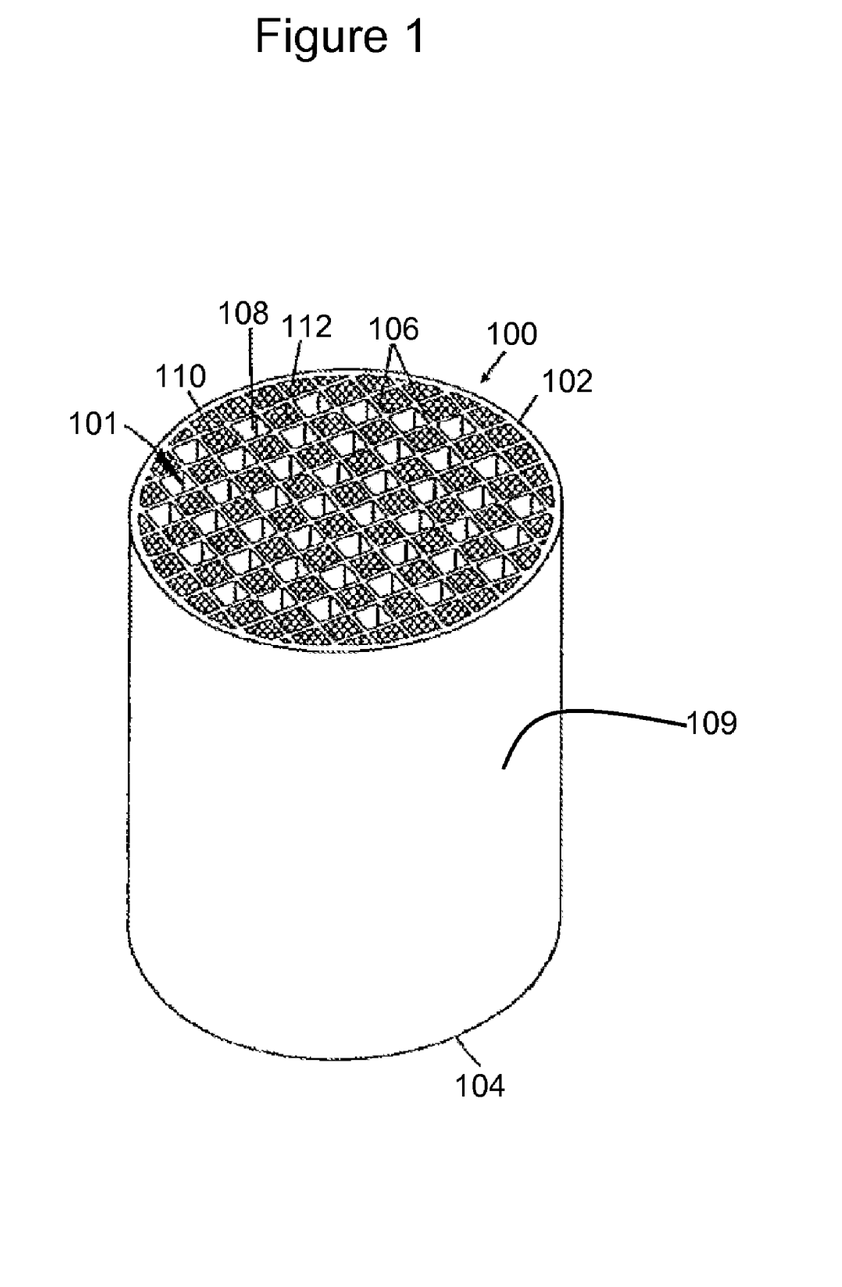
FIG. 1 is a perspective view of a ceramic honeycomb substrate produced by the process of the invention.

FIG. 1 illustrates an example of a wall-flow ceramic honeycomb substrate 100 that the method of the invention has been applied to. The substrate 100 includes a matrix of ceramic walls 106 which define a plurality of parallel, gas-conducting cells 101. In such a wall-flow substrate, the walls 106 may be between about 12 and 25 mils thick, and the cell density may be between about 100 to 400 cells per square inch, although any cell density and wall thickness may be applicable. The substrate has an outer skin 109 that may be about three times thicker than the walls 106. The gas conducting cells 101 have inlet ends 102 and outlet ends 104 where exhaust gasses are received and expelled, respectively. The inlet 102 and outlet ends 104 of the gas conducting cells 101 may be plugged with plugs 112 in a checkerboard pattern such that each of the cells 101 has an open end and a plugged end. For wall-flow ceramic honeycomb substrates, gasses entering the open inlet ends 108 of the cells are blocked from flowing through the outlet ends (not shown) of such cells, and must instead flow through the walls 106. Walls 106 are made from porous ceramic that makes such flow-through possible. Large particles such as soot and ash are trapped in the porous ceramic material as gasses flow through the walls 106. For flow-through substrates, none of the channels are plugged.

Figure 2:
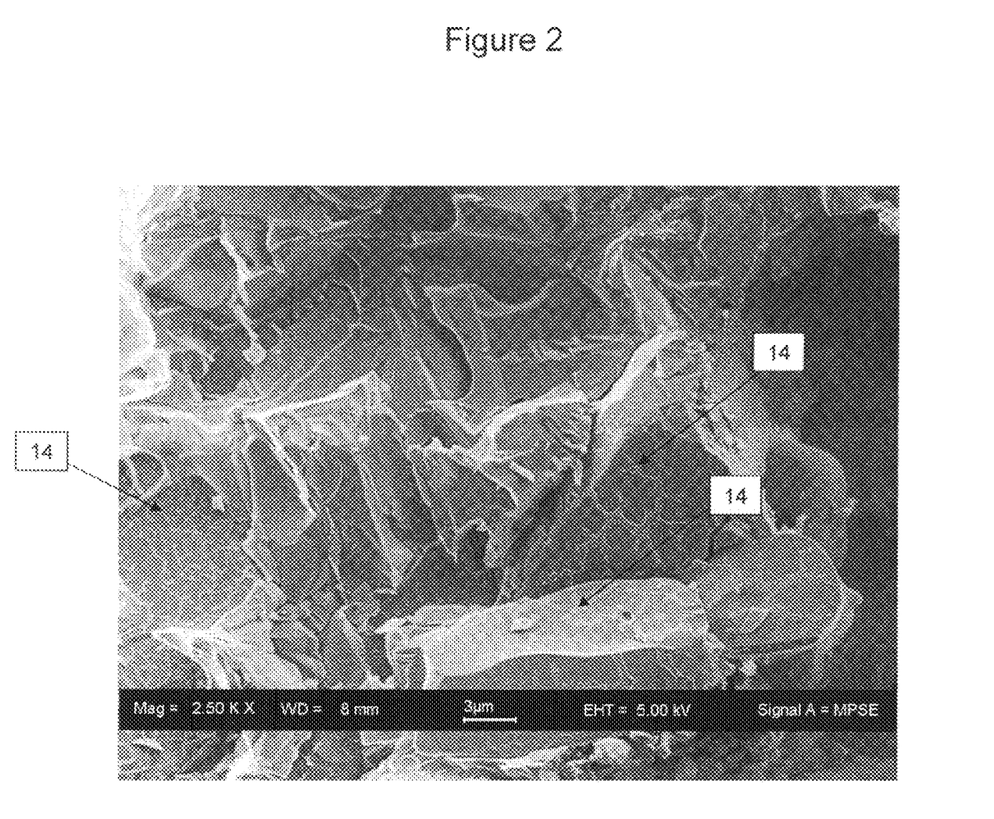
FIG. 2 is a micrograph of the surface of a wall formed from aluminum titanate, illustrating surface deposits of washcoat particles.

FIG. 2 is a photomicrograph of the surface of a cross section of an aluminum titanate wall 106 as illustrated in FIG. 1. While the process of the invention may be applied to any ceramic substrate characterized by at least some amount of microcracking, it is preferably applied to substrates formed from ceramic materials characterized by a high density of microcracking, such as aluminum titanate. This microphotograph shows deposits of washcoat particles within the network of pores contained within the walls 106. The deposits shown are dendrite structures 14. These dendrite structures 14 are networks of washcoating particles, which provide a scaffolding structure and act to hold microcracks open after heat treatment.

Figure 3:
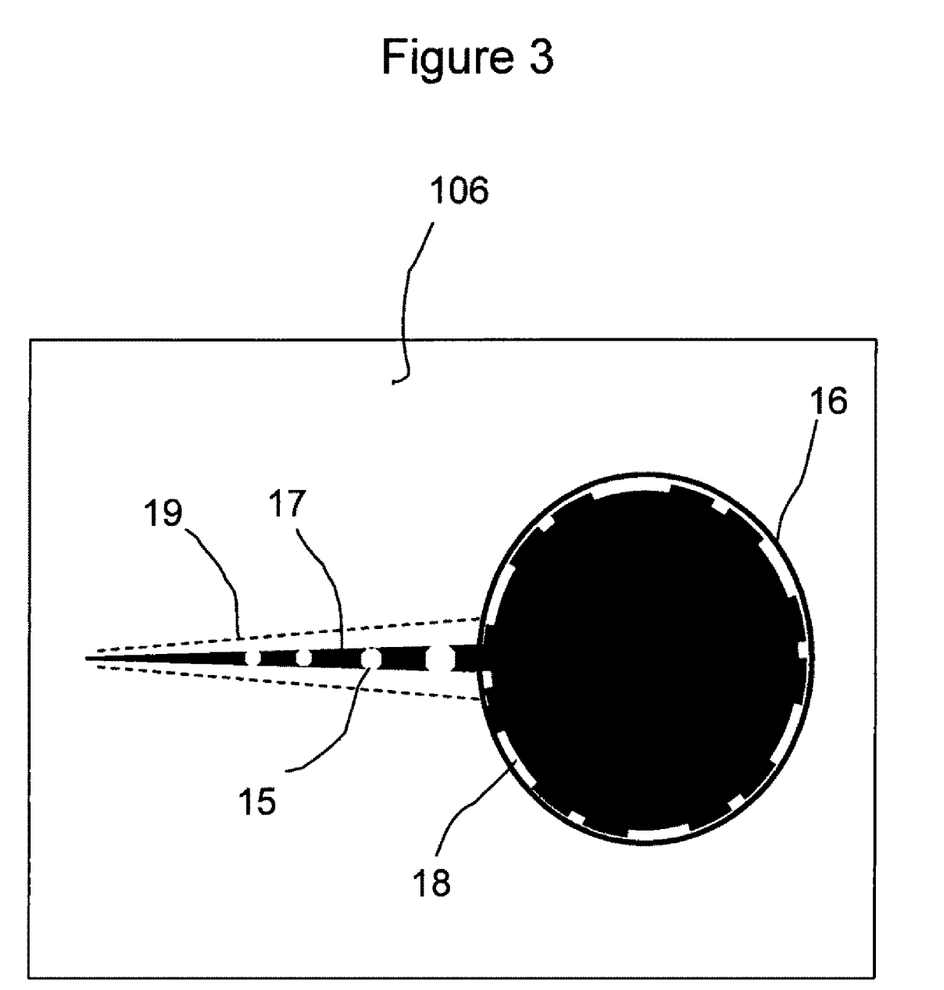
FIG. 3 is a schematic representation of a pore and a microcrack in a web wall of the substrate, illustrating how deposits of washcoating particles can form particle "pillars" that prevent the microcrack walls from closing in response to thermal expansion.

FIG. 3 is a schematic diagram illustrating a pore 16 and microcrack 17 in a wall 106 of a ceramic honeycomb structure after the washcoating has been applied, and after a heat treatment step of an embodiment of the process of the invention has been completed. A slurry of a particulate washcoating composition is applied to the surface of the substrate 100, and the walls 106 of the substrate 101 are exposed to a vacuum. The sub-atmospheric pressure exerted by the vacuum pulls the slurry of washcoating composition through the network of interconnected pores 16 in the walls 106 and into the microcracks 17. Washcoating material 18 is deposited on the surfaces of the substrate in the pores 16 and in the microcracks 17 of the substrate.

In embodiments, the washcoating material 18 contains particles 15 that are a component of the washcoating slurry preferably has an average particle diameter of between about 500 nm and 6 microns, between about 400 nm and about 6 microns, between about 300 nm and about 6 microns or between about 200 nm and about 6 microns. Particles having a diameter within the aforementioned ranges are large enough to form deposits between the walls of the cracks that are strong enough to resist the closing of the crack walls during the heat treatment step, yet are small enough to lodge between the walls of the microcracks 17. In embodiments, these particles may deposit within the microcracks 17 as particles, or the particles may form structures such as pillars or dendrites within the microcracks.

The composition of the primary particulate component of the washcoating slurry is preferably alumina. If the slurry does not include a particulate catalyst (which may be platinum, palladium, rhodium, or any other catalytic material known in the art or various alloys thereof,) then the washcoating layer formed by the process of the invention serves as a catalyst support layer. Alternatively the slurry may not include such a particulate catalyst, in which case the resulting washcoating layer serves as a catalytic layer. It is important to note that the application of a vacuum to the web walls 106, in combination with the network of interconnected pores 16 in the walls 106, has the effect of depositing the particulate component of the washcoating slurry in substantially all of the microcracks 17.

After the washcoating material 18 has been deposited onto the surfaces of the pores 16 and particles 15 have been lodged in microcracks 17, in embodiments of the methods of the present invention, a heat treating step is provided. During this heat treating step, the ceramic substrate 106 expands. Microcracks 17 that are filled with washcoating particles 15 cannot close in response to the expansion of the ceramic substrate during the heat treating step. Instead, because of the presence of the washcoating particles 15, which act as a fulcrum, the expansion of the ceramic substrate causes the microcracks to expand, as shown by the dashed lines 19 in FIG. 3.

Figure 4:
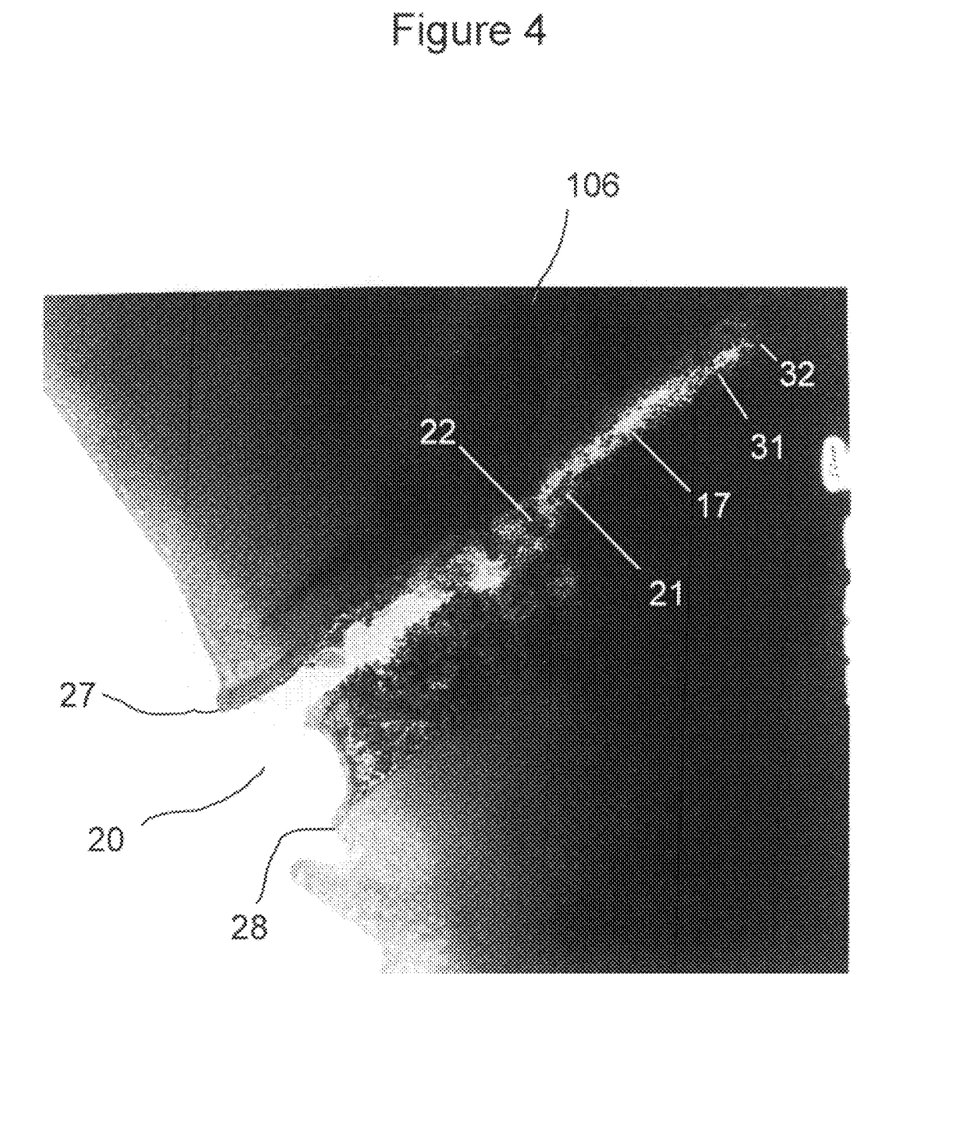
FIG. 4 is a micrograph of a microcrack in an aluminum titanate structure, illustrating pillar and dendrite structures.

FIG. 4 is a microphotograph of a microcrack 17 in a wall 106 of a ceramic honeycomb substrate. FIG. 4 illustrates how the particulate deposits 15 of the washcoating slurry lodged in a microcrack 17 form "dendrite" 21 and "pillar" 22 structures from the microcrack opening 20 to its end 31. During the heat treatment step of an embodiment of the method of the invention, the honeycomb substrate 100 is heated to between about 700° C. and about 1300° C. Regardless of the peak temperature chosen, the heating step is preferably conducted by placing the ceramic substrate in a kiln and by slowly ramping up the temperature at a rate of about 4° C. per minute until the peak temperature is achieved. The substrate 100 is then exposed to the selected peak temperature for about 5 minutes, and then allowed to cool. When a particulate catalyst is present in the washcoating 18, the substrate is heated to between about 700° C. and 1000° C. When no particulate catalyst is present, the substrate may be heated to the upper end of the 1300° C. range.

In either case, the heat treatment step of the invention performs two important functions in the manufacture of the substrate 100. First, as was the case in the prior art, the heat treating step stabilizes the surface area of the alumina component of the washcoating (which is typically about 200-300 m2/g) by making it more uniform throughout the washcoating. Second, and more importantly, the heat treatment step causes the opposing walls 27 and 28 of the microcrack 17 to attempt to close together as a result of thermal expansion of the substrate. However, because of the resistance applied by the dendrite and pillar-like structures 21 and 22, the opposing walls 27 and 28 cannot close up. The resulting forces generate a stress envelope at the end 31 of the microcrack 17 which in turn causes the microcrack 17 to fracture in this region, extending the length of the microcrack 17 from 31 to 32. The resulting forces may also widen the opening 20 of the microcrack 17. Hence the heat treating step of the process serves to enlarge the microcracks 17 present within the substrate 100.

The applicants have unexpectedly discovered that the heat treating step does not merely enlarge the expansion capability of microcracks 17 to an extent necessary to accommodate the dendrite and pillar-like structures 21 and 22 created by the particulate deposits 15 of the washcoating; rather, the applicant instead discovered that the heat treating step actually enlarges the microcracks 17 to an extent that exceeds their ability to accommodate the dendrite and pillar-like structures 21 and 22. Hence the net distance between the opposing walls 27 and 28 of the microcracks is actually increased as a result of the heat treating step, which in turn decreases the coefficient of thermal expansion (CTE) since the microcracks 17 (which function in the same basic manner as expansion joints) can absorb more of the thermal expansion of the ceramic material forming the substrate 100 before all the microcracks close up and the dimensions of the substrate begin to increase. The resulting net increase in the distance between the microcrack walls 27, 28 also advantageously results in a decrease in the elastic modulus ($E_{mod}$) of the ceramic material, reducing the tensile forces generated within the substrate 100 as a result of thermal expansion. Most surprising of all, the applicants have discovered that these reductions in CTE and $E_{mod}$ more than compensate for any reductions in the modulus of rupture strength (MOR) of the substrate caused by microcrack enlargement such that the over-all ability of the substrate to withstand thermal shock, as determined by its thermal stress parameter (TSP), which in turn is equal to MOR/[CTE·$E_{mod}$]) is actually increased.

Figure 5A:
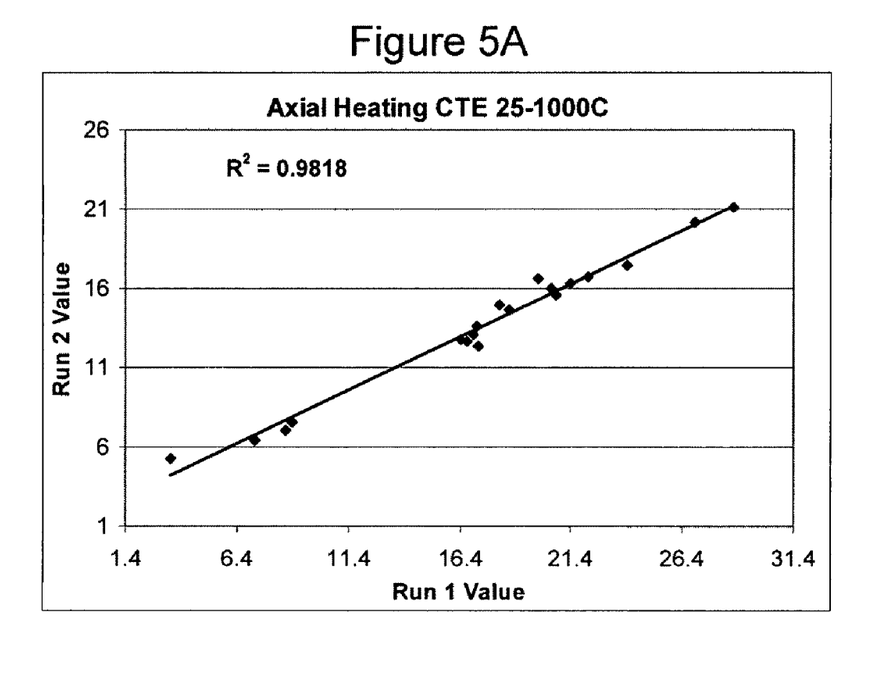
FIGS. 5A and 5B are graphs illustrating the difference in the CTE and $E_{mod}$, respectively after the ceramic substrate has been heat treated to temperatures of 1000° C. and 1200° C. respectively in accordance with the process of the invention for different substrates, each having a different initial CTE and $E_{mod}$.
Figure 5B:
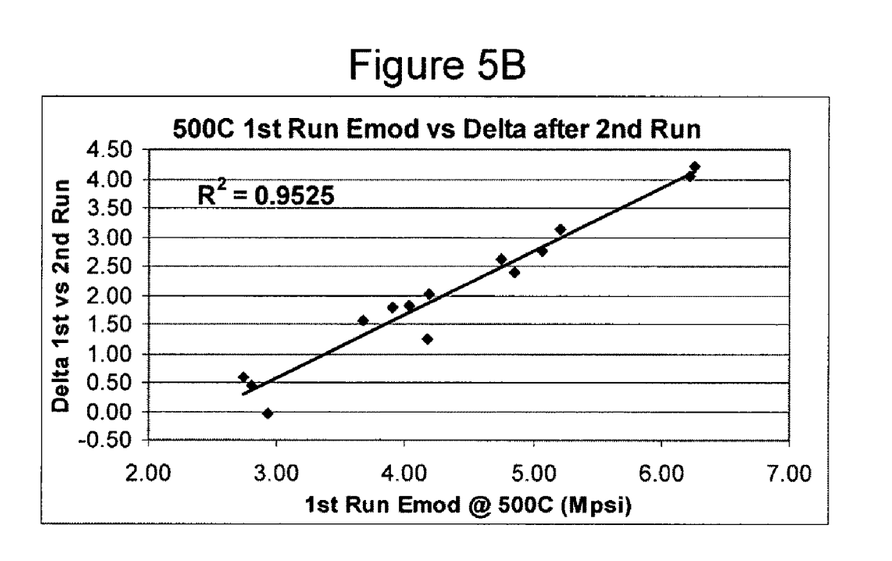

The graphs of FIGS. 5A and 5B illustrate the difference in the CTE and $E_{mod}$, respectively, after the ceramic substrate has been heat treated to temperatures of 1000° C. and 1200° C. respectively in accordance with the process of the invention for a number of different substrates, each of which is formed from aluminum titanate, but each having a different initial CTE and $E_{mod}$. The data points plotted in FIG. 5A, where the Run 1 value is plotted on the X axis and the Run 2 value is plotted on the Y axis, where Run 1 measurements were taken before a heat treatment to 1000 degrees C. and Run 2 measurements were taken after a heat treatment to 1000 degrees C., demonstrate a substantially linear relationship between the amount of reduction in the CTE (i.e., the Delta 1$^{st}$ Run vs. Second Run) and the initial CTE of the substrates (i.e., the 1$^{st}$ Run CTE) achieved by a heat treatment step where the substrates are heated to a peak temperature of 1000° C. Stated differently, those substrates having the highest initial CTEs experienced the greatest reductions in CTE after a 1000° C. heat treating step. In FIG. 5B, 500° C. $E_{mod}$ measured during a first exposure to 1200° C. is plotted on the X axis. The difference in 500° C. $E_{mod}$ measured during the first versus the second heat treatment to 1200° C. is plotted on the Y axis, and indicates that an analogous conclusion may be drawn with respect to reductions in $E_{mod}$.

The data presented in Table 1 below illustrates the difference in modulus of rupture strength (MOR) before and after a heat treatment step of 1200° C. for a substrate subjected to a prior art passivation coating step that prevented washcoating particles from lodging within the microcracks of the substrate, and a substrate treated according to embodiments of the present invention.

the heat treatment process of the invention, the amount of pressure required to rupture the substrate fell 50 psi (264 psi–214 psi). Hence rupture strength of the unpassivated substrate actually fell 20 psi less than the passivated substrate. For the outlet portion of the passivated vs. unpassivated substrates, the amount of pressure required to rupture the substrate fell 33 psi vs. 60 psi, respectively. Hence the rupture strength of the unpassivated substrate fell 27 psi more than the passivated substrate. Consequently, the net difference in rupture strength between the passivated vs. unpassivated substrates is only 20 psi–27 psi=7 psi, which amounts to only about 2.5%. As will be seen hereinafter, this small reduction in rupture strength of substrates treated in accordance with embodiments of the invention is more than compensated for by the reductions in the CTE and $E_{mod}$ such that the resulting thermal shock parameter (TSP) is either the same or substantially improved.

TABLE 1

|  | Inlet - No Heat Treatment | Inlet - After 1200 C. Heat | Outlet - No Heat Treatment | Outlet - After 1200 C. Heat |
|---|---|---|---|---|
| | | Passivated Coated Part | | |
| 25° C. Strength, psi | 281 | 211 | 247 | 214 |
| Std Dev | 14 | 10 | 15 | 7 |
| | | Unpassivated Coated Part | | |
| 25° C. Strength, psi | 264 | 214 | 270 | 210 |
| Std Dev | 13 | 10 | 16 | 12 |

From Table 1, it can be seen that the reduction in rupture strength of the inlets and outlets of the two different substrates after a heat treatment step of 1200° C. are similar, despite the fact that the unpassivated substrate has experienced microcrack enlargement as a result of the washcoating particles lodged in the microcracks during the heat treatment step of 1200° C. Specifically, for the inlet portion of the passivated substrate, the amount of pressure required to rupture the substrate fell 70 psi after heat treatment (281 psi–211 psi). For the inlet portion of the unpassivated substrate that underwent Table 2 below compares (1) strain tolerance (ST) (MOR/$E_{mod}$), (2) stress parameter (SP) (calculated as strain*$E_{mod}$), (3) SP/MOR, the ratio of the scalar stress to the strength of the material (values greater than unity indicate a higher probability of failure), and (4) the thermal shock parameter (TSP) of the outlet portions of substrates that have (a) undergone a prior art passivation coating prior to being catalytically washcoated or not, and (b) undergone the heat treatment method of the invention at 1000° C. and 1200° C. or not.

TABLE 2

| Sample Description | ST [RT] (MOR/Emod) | SP [RT], psi (dL/L$^{ht}$ – dL/L$^{lt}$ * Emod) | SP/MOR [RT], psi | TSP [RT], ° C. (MOR/Emod * CTE) | Comments |
|---|---|---|---|---|---|
| Passivated: Outlet No Heat Treatment | 0.0012 | 184.86 | 0.75 | 1297 | Control |
| Passivated: Outlet Emod & MOR Heat to 1200 C. CTE Heat to 1000 C. | 0.0010 | 163.87 | 0.76 | 1267 | Similar vs. Control |
| Passivated: Outlet CTE, Emod & MOR Heat to 1200 C. | 0.0010 | 120.32 | 0.56 | 1723 | Better vs. Control |
| Unpassivated: Outlet No Heat Treatment | 0.0015 | 310.53 | 1.15 | 842 | Control |
| Unpassivated: Outlet Emod & MOR Heat to 1200 C. CTE Heat to 1000 C. | 0.0011 | 223.80 | 1.07 | 909 | Similar vs. Control |
| Unpassivated: Outlet CTE, Emod & MOR Heat to 1200 C. | 0.0011 | 110.92 | 0.53 | 1829 | Better vs. Control |

From Table 2 above, one can observe little or no degradation of thermo-mechanical performance after heat treatments. In addition, an improvement is actually seen when CTE data is used after heat treatment to 1200° C. (vs. 1000° C.). Strength data at lower temperatures (not shown) showed the strength reduction to occur with heat treatments at greater than 800° C. The wash-coated heat-treated microcracked substrate, that has undergone a heat treatment of at least 1200° C., where the substrate has dendrite and pillar structures formed from a particulate constituent of a washcoating composition, shows a Thermal Shock Parameter (TSP) of at least 1200° C. As the TSP increases, the tolerance for thermal gradients improves. According to Table 2 above, the TSP of the unpassivated, wash-coated, heat-treated microcracked substrate, which has dendrite and pillar structure formed from a constituent of a washcoating composition, is measured at 1829° C.

Table 3 below compares the density of microcracks in an aluminum titanate substrate before (1$^{st}$ Run) and after (2$^{nd}$ Run) the heat treating method of the present invention for nine sample substrates having different initial microcrack densities and CTEs.

TABLE 3

| | ~CTE | Nb3 | | |
|---|---|---|---|---|
| | (RT – 1000) | 1st Run | 2nd Run | Delta |
| Sample 1 | 25 | 2.941 | 4.554 | 1.613 |
| Sample 2 | 26 | 2.966 | 4.537 | 1.571 |
| Sample 3 | 19 | 3.666 | 4.823 | 1.157 |
| Sample 4 | 22 | 3.236 | 4.297 | 1.061 |
| Sample 5 | 20 | 3.41 | 4.44 | 1.027 |
| Sample 6 | 18 | 3.817 | 4.744 | 0.927 |
| Sample 7 | 16 | 3.886 | 4.37 | 0.484 |
| Sample 8 | 17 | 4.225 | 4.529 | 0.304 |
| Sample 9 | 16 | 4.344 | 4.477 | 0.133 |

Figure 6:
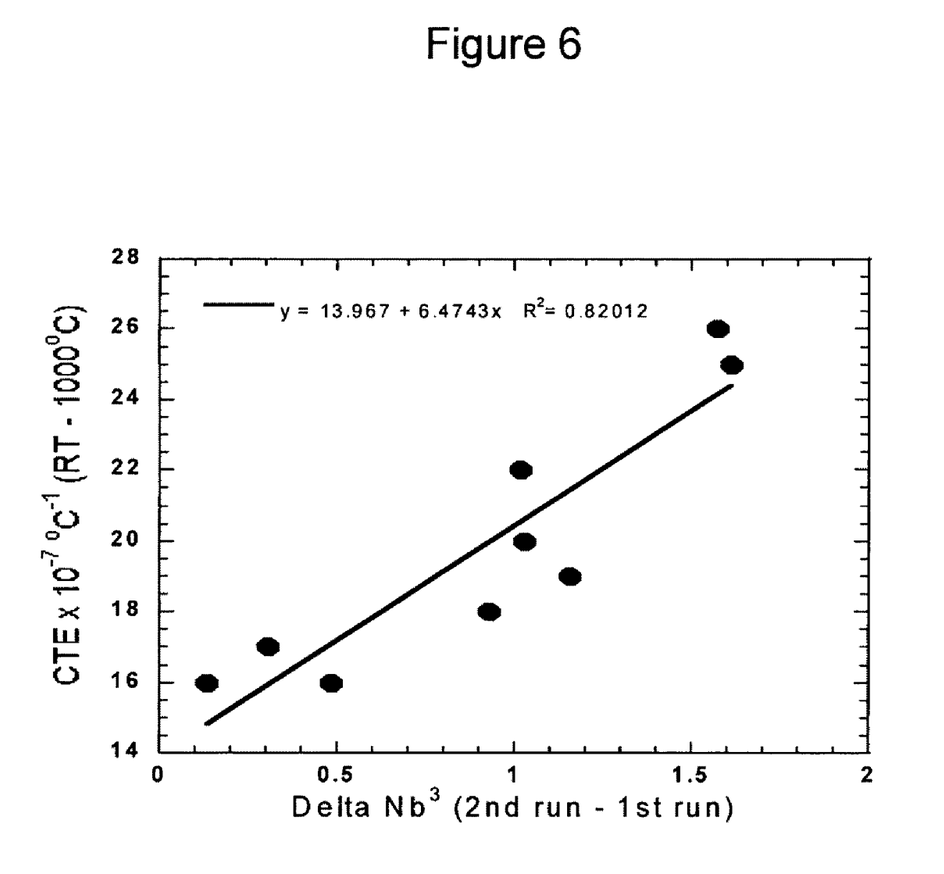
FIG. 6 is a graph comparing the density of microcracks in an aluminum titanate substrate before and after the heat treating method of the invention for nine sample substrates having different initial microcrack densities and CTEs.

FIG. 6 is a graph illustrating the data in Table 3, showing $\Delta Nb^3$ on the X axis and $CTE \times 10^{-7}$ (RT—1000° C.) on the Y axis. The improvement in CTE and $E_{mod}$ is related to increases in the volume of microcracks post heat treatment. The $Nb^3$ factor is derived from the $E_{mod}$ heating curve to 1200° C. and is an indirect measure of the catalytic filter substrate's microcrack volume. $Nb^3$ is calculated as $[Eo/E-1]/1.8$ where E=Elastic modulus at RT with microcracks, Eo=Elastic modulus at RT without microcracks, N=number of microcracks and b=the average length of microcracks. $Nb^3$ is a measure in units of volume given that the average crack length b, is cubed. To a first approximation, the presence of microcracks reduces the Elastic modulus (E) by $E/Eo=[1+(1.8)Nb^3]/1$. See Z. Hashin, "The Differential Scheme and Its Application to Cracked Materials," J. Mech. Phys. Solids 36 [6] (1988).

The initial microcrack volume, the first run microcrack volume shown in Table 3 and FIG. 6, $Nb^3$(initial), measured after a washcoating step but prior to a heat-treatment defined by $Nb^3$ is between about 2.90 and 4.35 in aluminum titanate samples. Cordierite values are an order of magnitude lower and fall between about 0.25 and 0.65, (data not shown). The microcrack mechanism is the same for cordierite material. The microcrack volume, measured after a heat-treatment, the second run microcrack volume shown in FIG. 6, defined by $Nb^3$(after heat-treatment) is between about 4.3 and about 4.8. Microcracks are enlarged as defined by $\Delta Nb^3$ where $\Delta Nb^3 = Nb^3$(initial)$-Nb^3$(after heat-treatment). The $Nb^3$ values increase from the 1st run, as coated, to the 2nd run post heat treatment, as shown in Table 3 and FIG. 6. The microcracks are enlarged, as defined by $\Delta Nb^3$ from between 3% and 55%. The improvement in CTE and $E_{mod}$ is related to increasing volume of microcracks post heat-treatment. FIG. 6 is the delta in the volume of the microcracks (as indicated by $Nb^3$) for initial (1$^{st}$ run) and after heat-treatment (2$^{nd}$ run) runs as a function of CTE. The delta $Nb^3$ result is consistent with microcrack extension and enlargement as a result of the pillaring by the catalyst washcoat and heat treatment.

Figure 7A:
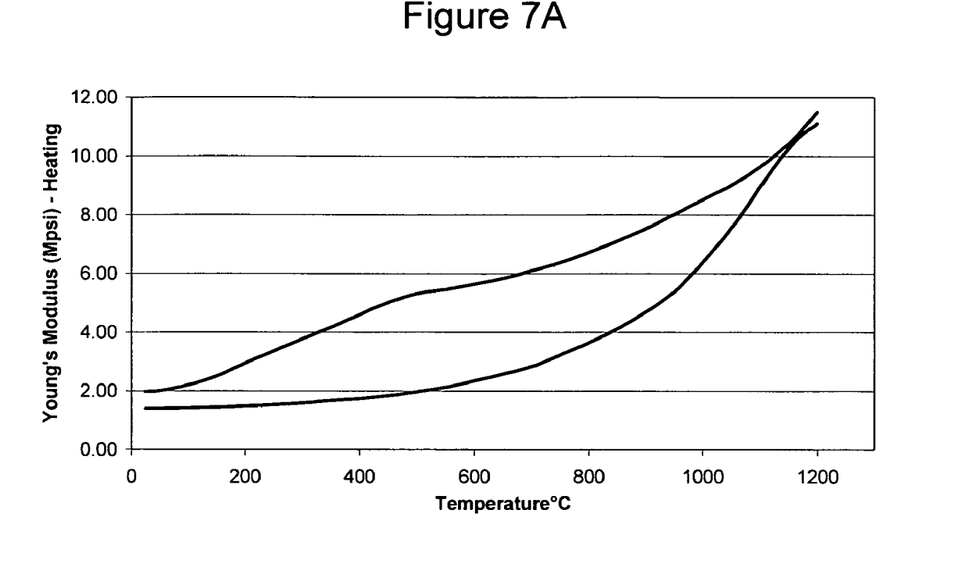
FIG. 7A is a graph illustrating the $E_{mod}$ vs temperature during a heat treatment in a first run (◊) and after the heat treatment in a second run (○) in an aluminum titanate ceramic substrate.
Figure 7B:
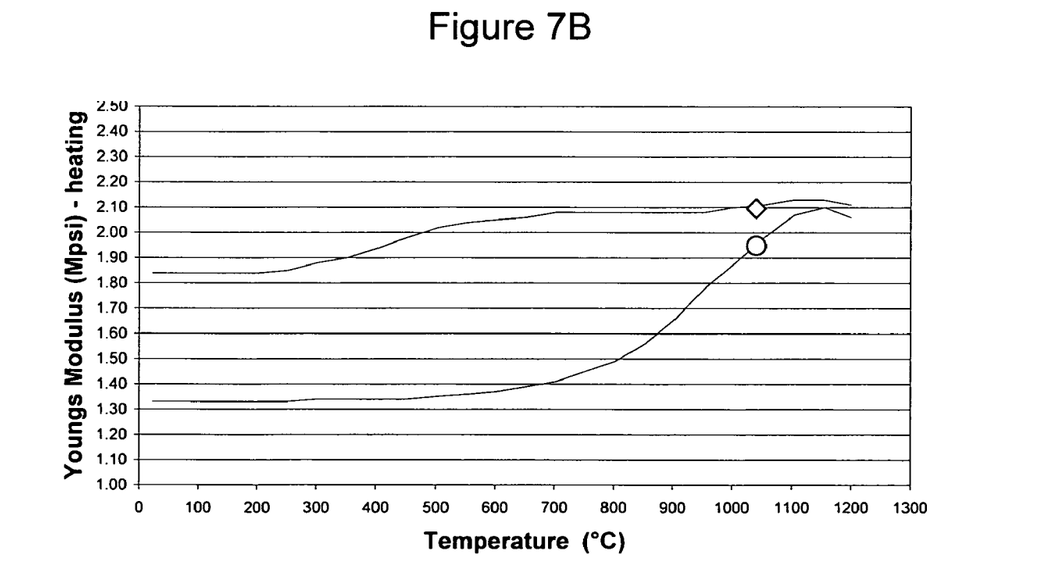
FIG. 7B is a graph illustrating the $E_{mod}$ vs temperature during a heat treatment in a first run (◊) and after the heat treatment in a second run (○) in a cordierite ceramic substrate; and, FIG. 8 is a graph illustrating comparative bare (●) and passivated (Δ) aluminum titanate ceramic substrates subjected to a heat treatment.

FIGS. 7A and 7B demonstrate the physical changes that materials experience through embodiments of heat treatments of the present invention. FIGS. 7A and 7B illustrate $E_{mod}$ vs temperature as aluminum titanate (FIG. 7A) and cordierite (FIG. 7B) ceramic honeycomb structures undergo heat treatments. The first run heat treatment (◇) is a heat treatment that is applied to a washcoated, ceramic honeycomb structure. This first run heat treatment is an embodiment of the heat treating step of the present invention. The second run (○) is a heat treatment applied to the same washcoated ceramic honeycomb structure after it has undergone the first run treatment. In the second run, it can be seen that the physical characteristic, for example the $E_{mod}$ shown in FIGS. 7A and 7B (and FIG. 8) changes as a result of the heat treatment.

FIG. 7A illustrates the effects that result from the application of washcoat and the heat treatment of an embodiment of the present invention. The washcoat, which contains particles, for example alumina particles, ranging in size from 300 nm to 8 microns in diameter, settles onto the washcoated surfaces of the ceramic honeycomb substrate, permeating into the pores and microcracks of the substrate. In the first run (◇), as the temperature increases from room temperature to approximately 500° C., the $E_{mod}$ of the material increases in an approximately linear fashion. This initial linear rise in $E_{mod}$ is a reflection of the gradual closing of microcracks in the microcracked ceramic aluminum titanate (AT) material. At a temperature of between 400° C. and 600° C., the $E_{mod}$ reaches a plateau. This plateau is a result of the sintering and of the washcoat material in that temperature range. This sintering causes the washcoating to shrink, which allows the ceramic material more room to expand by closing microcracks in that temperature range. As the material heats to beyond the temperature range of the sintering of the washcoat, the $E_{mod}$ again increases. This first run (◇) is an embodiment of heat treatment of the present invention. The heat treatment is preferably conducted under controlled conditions which allows for a uniform heat treatment to the ceramic substrate. Heat treatments which are uneven, and create thermal gradients within the ceramic substrates, may damage the substrates and that damage might outweigh the beneficial effects of heat treatments.

As can be seen in the second run curve (○), after the washcoated part has been exposed to a heat treatment of 1000 to 1200° C., as shown in the second run curve (○) the $E_{mod}$ characteristics of the material are different. Through a temperature range of up to approximately 1100° C., the treated part shows a reduced $E_{mod}$ compared to the un-heat-treated part (shown in the 1st run). The part with the reduced $E_{mod}$ is less stiff, and better able to accommodate thermal and physical challenges. In use, these parts might see temperatures in the range of from 250 to 1000° C., or even 1200° C. A part with a higher $E_{mod}$ through these temperature ranges will have a higher probability of failure than a part with a lower $E_{mod}$.

FIG. 7B shows that this reduction in $E_{mod}$ also occurs in a cordierite ceramic substrate. Although the cordierite material does not show as dramatic a change in $E_{mod}$ over the temperature range, probably because the cordierite substrate is less microcracked, and therefore will show less of a change in $E_{mod}$ as microcracks within the substrate close in response to increasing temperature, this material also illustrates that embodiments of the heat treatment of the present invention act to reduce $E_{mod}$ and improve the characteristics of the treated substrates.

Figure 8:
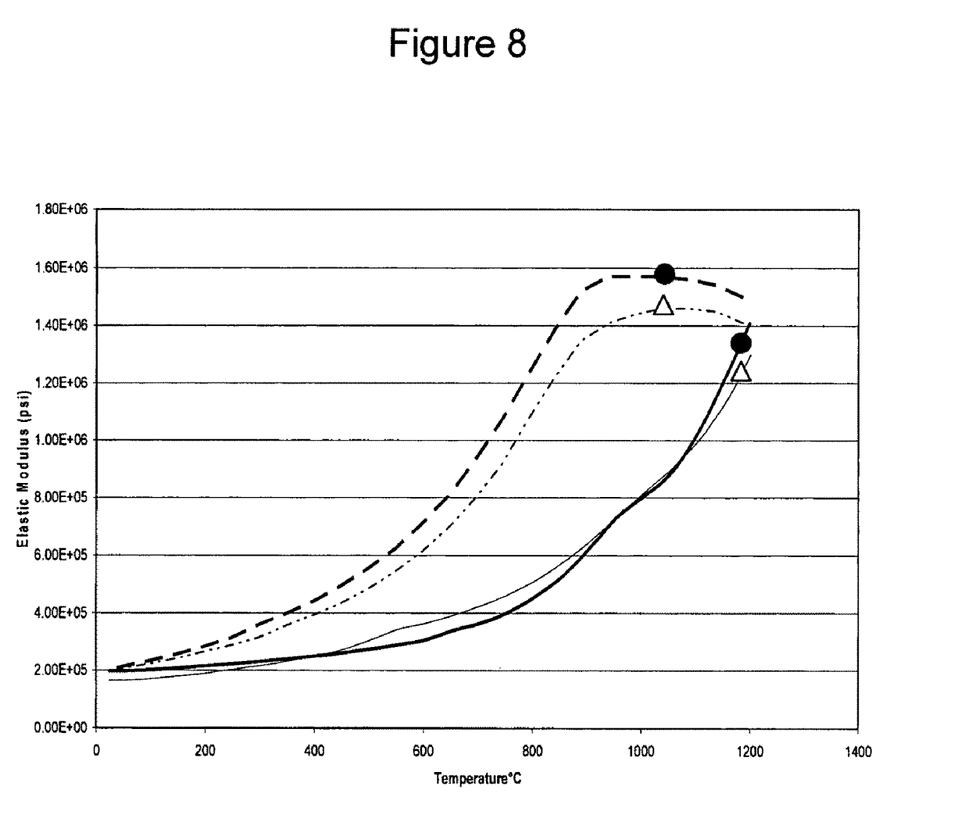

FIG. 8 illustrates the responses of comparative bare (●) and passivated (Δ) aluminum titanate ceramic substrates, upon heating (solid lines) and upon cool down (dashed lines). FIG. 8 illustrates that bare and passivated aluminum titanate ceramic substrates show $E_{mod}$ variations that are consistent with aluminum titanate (and cordierite) substrates which have undergone treatments consistent with embodiments of the present invention.

The washcoat applied to the interior microcracked surfaces of the substrate. The washcoat, which contains particles, for example alumina particles, ranging in size from 300 nm to 8 microns in diameter, settles onto the washcoated surfaces of the ceramic honeycomb substrate, permeating into the pores and microcracks of the substrate. The washcoat particles sinter together to form crystalline structures, in a temperature range of between 400 and 600 degrees. This sintering process creates a shrinkage in the washcoating, as the washcoating material changes in response to the increasing temperature.

While embodiments of the invention have been disclosed herein, modifications, additions, and variations of these embodiments are within the scope of the invention.

The invention claimed is:

1. A method of treating a microcracked ceramic honeycomb comprising the steps of:
   providing a ceramic honeycomb having microcracks;
   applying a washcoat solution comprising particles to the ceramic honeycomb under vacuum so that at least some of the particles enter the microcracks wherein the washcoat is pulled into the microcracks by vacuum;
   uniformly heat-treating the ceramic honeycomb with the applied washcoat to a temperature of between 700 and 1300° C. such that the microcracks are enlarged compared to a pre-heat treated state.

2. The method of claim 1, with the proviso that no passivation step is provided.

3. The method of claim 1, wherein said washcoat particles are alumina.

4. The method of claim 3, wherein said washcoat particles have an average particle diameter of between about 500 nm and 8 microns.

5. The method of claim 3 wherein said washcoat particles have an average diameter of between about 200 nm and 6 microns.

6. The method of claim 1, wherein said ceramic honeycomb comprises aluminum titanate or cordierite.

7. The method of claim 6, wherein said ceramic honeycomb comprises cordierite and wherein the uniform heat-treating step comprises heat-treating the ceramic honeycomb with the applied washcoat to a temperature of between 700 and 1000° C.

8. The method of claim 1, wherein said heat treating step reduces the modulus of elasticity ($E_{mod}$) of the microcracked ceramic honeycomb by at least 10% over a temperature range of between 200 and 1000° C. compared to an untreated ceramic honeycomb.

9. The method of claim 1, wherein said heat treating step causes at least about 60% of said microcracks in said ceramic honeycomb to be enlarged compared to a pre-heat treated state.

10. The method of claim 1, wherein said heat treating step causes at least about 90% of said microcracks in said ceramic honeycomb to be enlarged compared to a pre-heat treated state.

11. The method of claim 1 wherein said heat treating step causes dendrites or pillars to form within the microcracks.

12. The method of claim 11 wherein the dendrites or pillars within the microcracks cause the microcracks to enlarge when the ceramic honeycomb is heat-treated.

13. A method of treating a microcracked ceramic honeycomb comprising the steps of:
   providing a ceramic honeycomb having microcracks;
   applying a washcoat solution comprising particulate alumina having an average diameter of between 200 nm and 8 microns to the ceramic honeycomb under vacuum so that at least some of the particles enter the microcracks wherein the washcoat is pulled into the microcracks by vacuum;
   uniformly heat-treating the ceramic honeycomb with the applied washcoat to a temperature of between 800 and 1300° C. such that the microcracks in the ceramic honeycomb are enlarged compared to a pre-heat treated state.

14. The method of claim 13, wherein the washcoat solution further comprises a catalyst.

15. The method of claim 14 wherein the catalyst is selected from the group consisting of platinum, palladium and rhodium.

16. The method of claim 14 wherein the heat-treating step comprises heating the coated substrate to a temperature of between 800 and 1000° C.

17. The method of claim 13, wherein the microcracked ceramic honeycomb is formed from aluminum titanate or cordierite.

18. The method of claim 13, wherein the microcracks are enlarged, as defined by $\Delta Nb^3$ from between 3% and 55%.

19. The method of claim 13, wherein said heat treating step reduces the CTE by at least 20%, compared to the pre heat-treated state.

20. The method of claim 13, wherein said heat treating step reduces the modulus of elasticity ($E_{mod}$) of the microcracked ceramic honeycomb by at least 10% compared to the pre heat-treated state.

21. The method of claim 13, wherein said heat treating step causes between about 60-90% of said microcracks in said microcracked ceramic honeycomb are enlarged compared to a pre-heat treated state.

* * * * *